United States Patent [19]

Mayr

[11] Patent Number: 4,810,429

[45] Date of Patent: Mar. 7, 1989

[54] METHOD AND APPARATUS FOR THE MANUFACTURE OF FILLED OPTICAL TRANSMISSION ELEMENTS

[75] Inventor: Ernst Mayr, Starnberg, Fed. Rep. of Germany

[73] Assignee: Siemens Aktiengesellschaft, Berlin and Munich, Fed. Rep. of Germany

[21] Appl. No.: 73,434

[22] Filed: Jul. 15, 1987

[30] Foreign Application Priority Data

Jul. 31, 1986 [DE] Fed. Rep. of Germany ....... 3625909

[51] Int. Cl.$^4$ .......................... B29D 11/00; G02B 5/14
[52] U.S. Cl. ........................................ 264/1.5; 156/64; 156/244.12; 156/244.23; 156/379; 156/500; 264/37; 264/40.1; 264/174; 425/113; 425/114; 425/173; 425/812; 427/163
[58] Field of Search ............... 264/1.5, 174, 37, 40.1; 427/163; 425/111, 112, 114, 113, 173, 812; 156/64, 244.12, 244.23, 379, 500

[56] References Cited

U.S. PATENT DOCUMENTS

| | | | |
|---|---|---|---|
| 3,556,635 | 1/1971 | Schrenk et al. .................. | 264/1.5 |
| 4,154,783 | 5/1979 | Jackson ............................ | 264/1.5 |
| 4,409,154 | 10/1983 | Grenat ............................. | 264/1.5 |
| 4,409,263 | 10/1983 | Aloisio, Jr. et al. ............. | 427/163 |
| 4,439,467 | 3/1984 | Kassahun et al. ............... | 427/163 |
| 4,474,638 | 10/1984 | Einsle ............................. | 156/494 |
| 4,480,898 | 11/1984 | Taylor ............................ | 427/163 |

FOREIGN PATENT DOCUMENTS 3516206 11/1986 Fed. Rep. of Germany .

Primary Examiner—James Lowe

[57] ABSTRACT

A method and apparatus for the manufacture of optical transmission elements comprising a bundle of at least one light waveguide lead having a coating of filling material and receiving an outer envelope, characterized by the method, including applying a first coating of filling material to the bundle, stripping a portion of the material from the coated bundle, applying a second coating and then, subsequently applying the envelope. By stripping a portion of the first coating of filling compound or material, air or gas bubbles in the filling compound will be stripped from the coated bundle and reduce the chance of damage to the light waveguide leads.

14 Claims, 1 Drawing Sheet

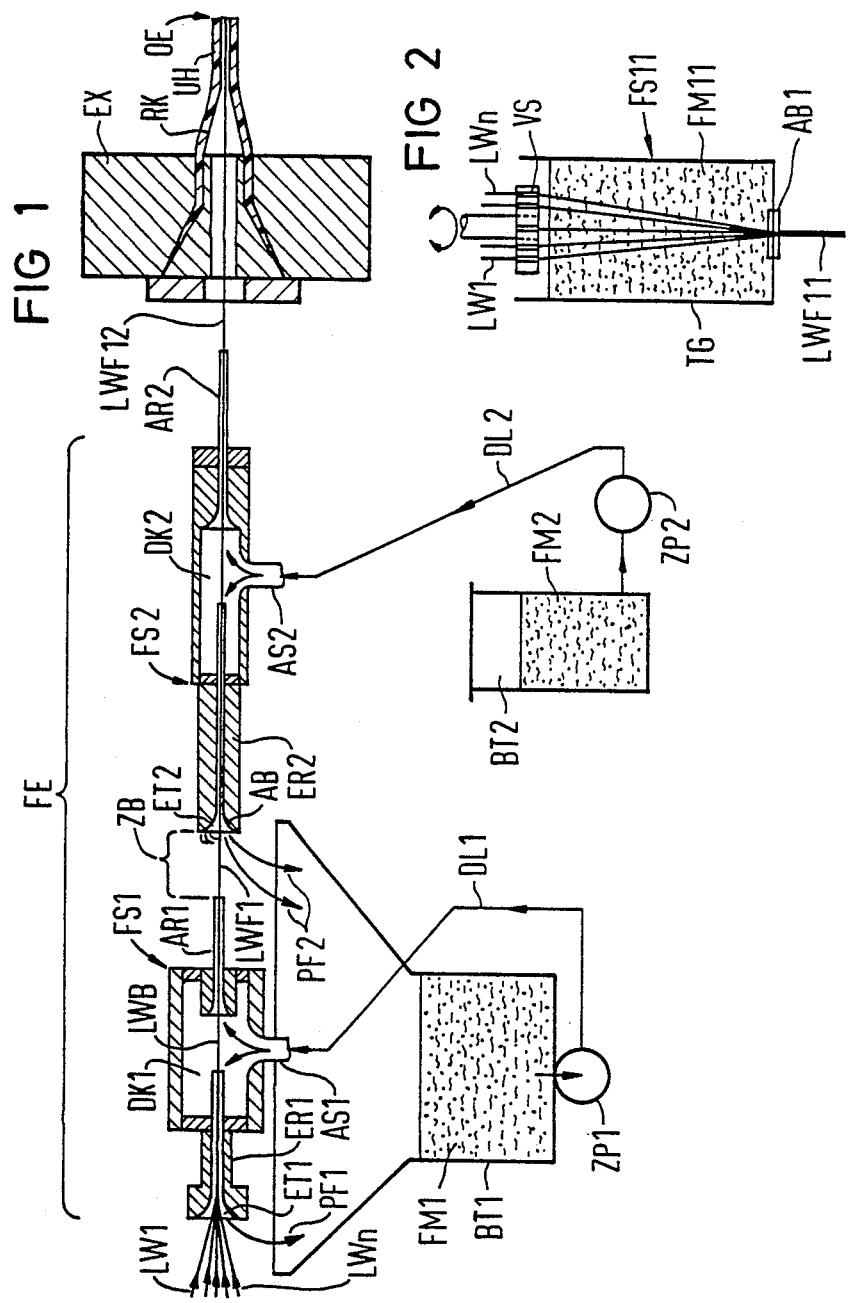

METHOD AND APPARATUS FOR THE MANUFACTURE OF FILLED OPTICAL TRANSMISSION ELEMENTS

BACKGROUND OF THE INVENTION

The present invention is directed to a method and apparatus for the manufacture of an optical transmission element comprising at least one light waveguide lead which is passed through two coating stations for the application of a filling compound in two layers and which is then, subsequently provided with an envelope.

A method for applying two coatings onto a transmission element, which has at least one or more optical waveguides, is disclosed in U.S. Pat. No. 4,474,638, which claims priority from German Application No. 32 07 083, and whose disclosure is incorporated by reference thereto. In the device of the patent, a light waveguide bundle is passed through a first moistening means, which is provided with a filling compound and has a discharge tube through which the bundle of leads with the filling compound is discharged. This filling tube extends through a second filling device, which has a concentric discharge tube so that a layer of the second filling material, which is under pressure, moves between the concentrically arranged first and second discharge tubes. These discharge tubes terminate within an extruder head in the region of the stretched cone of the envelope which is being applied so that the bundle with the first and second layers of filling compounds are introduced inside of the cone as the outer envelope is being extruded thereon.

Given transmission elements comprising light waveguides which are embedded in a soft filling compounds, care must be exercised to see that the material does not have any air inclusions or at least have very small air inclusions in terms of the volume of the material present. Otherwise, there is a risk that at a great temperature elevation, damage to the sensitive light waveguides can occur in the framework of the expansion of the air bubbles in the filling compound.

SUMMARY OF THE INVENTION

The object of the present invention is to provide a method and apparatus with which it is possible to reduce the number of enclosed small air bubbles and to keep the volume of the small air bubbles, which may nonetheless be present in the filling compound as small as possible.

In order to accomplish this, the method of the present invention is directed to an improvement in a method for manufacturing an optical transmission element, said method having the steps of providing an optical bundle having at least one light waveguide lead, applying a first coating of a filling material on the bundle, applying a second coating of a filling material on the coated bundle and then, subsequently, providing an envelope surrounding the coated bundle. The improvements comprise prior to applying the second coating, stripping off a portion of the first coating subsequently to the step of applying the first coating.

What is achieved by the invention is that the small air bubbles potentially co-introduced in the region of the first layer of coating material are completely removed during the stripping process, insofar as they lie in the portion of the filling material which has been subsequently stripped from the optical bundle. Only the remaining air bubbles lying on the innermost part of the reduced-diameter first layer of the filling compound can advance up to the second filling or coating step. Over and above this, the stripping process itself produces a pressure elevation in the inner region and a pressure drop in the outer region of the coating of the filling compound. The pressure elevation in the interior part of the layer is caused, for example, by passing through an opening of the stripping mechanism. The pressure drop towards the outer portions of the coating causes inward-lying air bubbles to also escape into the outer expansion region to a certain degree and are, thus, forced out. Whereas, in the prior art method, the air bubbles which were produced in the layers by the first or second filling steps had practically no possibility whatsoever escaping toward the outside, a significant improvement is achieved in the present invention on the basis of the hard stripping process, namely, particularly, in the region in which the light waveguide immediately lies, for example, the region of the first filling compound.

When a plurality of light waveguide leads are combined into the optical element or bundle, then the invention produces the additional advantage that potential gaps in which no filling compound has yet entered into are still filled with the filling compound within the bundle or element as a consequence of the stripping process.

The invention also has the further advantages that is particularly suitable for working at high throughput speeds through the device.

The invention is also directed to an apparatus for implementing the method of the invention, this apparatus is an improvement in an apparatus for manufacturing an optical transmission element comprising first means for applying a coating of filling material to an optical element, second means for supplying a second coating on the coated optical element, and means for applying an envelope around the optical element having the first and second coatings. The improvements are means for stripping a portion of the first applied coating being positioned between the first and second means so that a portion of the first coating of the filling material is stripped from the coated optical element prior to applying the second coating.

Other advantages and developments of the invention will be readily apparent from the following drawings, description of the preferred embodiments and claims.

BRIEF DESCRIPTION OF THE DRAWINGS

FIG. 1 is a schematic side view of an apparatus with portions in cross section for performing the method of the present invention; and FIG. 2 is a schematic side view of a filling and stripping apparatus in cooperation with a SZ stranding device.

DESCRIPTION OF THE PREFERRED EMBODIMENTS

The principals of the present invention are particularly useful when incorporated in a filling device FE of FIG. 1. One or more light waveguides, such as a plurality of light waveguide leads LW1-LWn, are taken down from supply reels, which are not shown, either tangentially or overhead. These are joined together into a light waveguide bundle LWB. While the apparatus illustrates a plurality of light waveguides LW1-LWn, it is also possible that only a single light waveguide or lead is utilized in the bundle and is to be surrounded with the filling compound and subsequently provided with an envelope. It also should be noted that the leads LW1-LWn may be gathered together loosely in the bundle or may be gathered into the bundle by an SZ stranding device.

The light waveguide leads, introduced as the bundle LWB, are introduced to pass through the apparatus FE which is constructed of at least two stages and operates with a first filling stage or station FS1 and with a second filling station or stage FS2. The filling states FS1 is, in turn, composed of an entry pipe or tube ER1 comprising a conical admission funnel ET1, a pressure chamber DK1 and an outflow pipe or discharge tube AR1. The light waveguide bundle, while passing through the first stage FS1, will be surrounded with a layer of a filling compound FM1 while in the region of the pressure chamber DK1. The filling compound FM1 is stored in a supply reservoir BT1 and is conveyed by an appropriate pump ZP1, which may be a gear pump, through a pressure conduit DL1 to an inlet fitting AS1 for the chamber DK1 of the first stage FS1. In order to avoid having air bubbles entrained in the feed of the light waveguide bundle LWB in the region of the entry tube ER1, the size of the bore in the entry pipe ER1 and the pressure in the pressure chamber DK1 are selected so that the filling compound FM1 is pressed or squeezed out at the entrance tube ER1 in a direction opposite to the movement of the bundle therethrough. As illustrated by arrows PF1, this excess filling compound, which is squeezed out of the entrance pipe or tube ER1, will be caught in the funnel-shaped upper portion of the reservoir BT1 so that no material is lost.

At the output of the pressure chamber DK1, the bore in the outflow pipe or discharge tube AR1 determines how much filling compound FM1 will remain on the light waveguide bundle. The light waveguide bundle coated with the filling compound at the output of the pipe AR1 is references LWF1 and, before it enters into the following filling station FS2, proceeds through an unpressurized intermediate region ZB, in which potential air bubbles contained in the filling compound FM1 can expand. Before entry into the second filling station or stage FS2, a hard stripping of the filling compound FM1 is carried out and this can occur by means of a suitable stripping mechanism, for example a perforated diaphragm or the like within the immediate region ZB or, on the other hand, can occur by means of an appropriate design of the entry pipe or nipple ER2 of the second filling stage FS2. The entry pipe ER2, comprising a conical emission funnel ET2, has its following bore diameter dimensioned so that a large part of the filling compound FM1 applied in the first pressure chamber DK1 will be stripped off. As indicated by the arrows PF2, the stripped off portion will proceed back into the reservoir BT1 to be reused. The stripping of the filling compound FM1 and the stripping region AB not only eliminates air bubbles, which may, nonetheless, still have been cold supplied from the filling step FS1, which are contained in the stripped material region, but also additionally yields a certain displacement effect for air bubbles lying still further toward the inside of the bundle, namely a displacement effect towards the outside opposite the throughput direction and in a radial direction. This is based on the fact that the pressure elevation occurs towards the inside in the region of the end of the emission funnel ER2 and results thereof being that the air bubbles are forced radially outward and, simultaneously, opposite the throughput direction and cannot proceed without further ado into the bore of the entry pipe ER2. In terms of volume, between 10% and 50% of the first layer of filling compound should be stripped off.

Whereas the reservoir BT1, for the first filling stage FS1, can use an open container, a container BT2 for the second filling stage FS2 is designed as a closed container that can be degasified to the greatest possible degree. Thus, the filling compound FM2 in the container BT2 will be subjected to an under pressure or vacuum while in the container BT2, so that the fewest possible air bubbles will remain in the filling compound. The filling compound FM2 is supplied to a connecting piece AS2 of a pressure chamber DK2 of the second filling stage FS2 by a pump ZP2 and a pressurized conduit DL2. The filling compound FM2 applied in this way is additionally present at the output of the outflow pipe or discharge tube AR2 of the pressure chamber DK2 and the bundle thus obtained is references LWF12. A small part of the first layer of the filling compound FM1 from the first filling stage FS1 is present on the inside and the second layer of the filling compound FM2 of the second filling stage FS2 is present on the outer surface of the bundle LWF12.

What is particularly advantageous, given the inventive apparatus for applying filling compounds, is that the filling needle, for example, the outflow or discharge tube AR2, need not extend up and into the stretching cone RK of the envelope UH, which is being applied by an extruder EX. In addition to easier accessibility, this also has the advantage that a renewed, relaxing of the filling compound FM1 and FM2 can occur in the region of the extruder EX so that the remaining gas bubbles can still proceed towards the outside, particularly from the outside region. This movement is intensified by the elevated temperature in the region of the extruder EX, and this movement of the bubbles will occur before the envelope UH is applied and, thus, the finished optical transmission element OE is produced.

The following operation parameters can be expediently provided for the individual stages set forth hereinabove:

The bore of the entry pipe ER1 is between 100% and 600% greater than the outside diameter of the uncoated light waveguide bundle LWB.

The pressure in the pressure chamber DK1 is between 2 and 50 bars (given overhead hull-off, the filling stage FS1 becomes a filling compound brake wherein a longer emission and outflow pipes and pressure become higher.

The bore of the outflow or discharge tube AR1 is between 200% and 400% greater than the outside diameter of the light waveguide bundle LWB.

The bore of the entry pipe ER2 and, thus, the stripping mechanism AB is between 100% and 300% greater than the outside diameter of the light waveguide bundle LWB and, in any case, smaller than the bore of the outflow tube AR1;

The operating pressure in the pressure chamber DK2 is between 1 and 50 bars; and The bore diameter of the outflow pipe AR2 is between 100% and 700% greater than the diameter of the light waveguides LWB and approximately identical to the outside diameter of the finished envelope.

Due to the throughput of the filling compound FM1, both in the throughput direction, i.e., via the outflow pipe AR1, as well as the opposite direction through the entry pipe ER1, the filling step FS1 also offers a possibility that could be used as a control for the tensile force of the light waveguide bundle LWB. When a greater quantity of filling compound FM1 from the pressure chamber DK1 is conducted to the inlet funnel ET1 opposite the through-put direction, i.e., via the entry pipe ER1, then a more pronounced braking effect will occur. Given overhead haul-off, up to n separate and identically long entry pipes can be provided instead of the one entry pipe ER1 for n fibers. When less filling compound FM1 is moved in the direction or when lower pressures are utilitized, then a less pronounced braking effect will occur. Not only is the penetration of the air thus prevented in this region, but a metered braking effect can also be achieved by the first filling step FS1 acting as a filling compound brake. This is particularly significant, given fibers hauled off overhead, because their smoothing and alignment are thereby improved. When lead braking is utilized, then the pressure in the first filling station or stage FS1 must be selected higher than in the second filling station or stage FS2, preferably 5 to 10 times as high.

Without the braking effect in the first station, it is expedient, when the pressure in the filling station FS2 is selected between 2 and 50 times as high as in the filling station FS1. Moreover, it is also expedient when the pressure in the intermediate region ZB is selected lower and roughly corresponds to ambient pressure or atmospheric pressure.

The above-described method for the introduction of the filling compound has the advantage that the filling pressure downstream of the last filling station or stage FS2, for example, at the output of the outflow pipe AR2, is decoupled in the coated bundle LWF12 can enter non-pressurized into the stretching cone RK of the envelope UH, which is being extruded from the extruder EX. Encrustations at the discharge opening of the outflow tube AR2, which can be considered as a filling needle, are eliminated. Should they nonetheless occur, they can be easily stripped off, because the outflow opening is accessible because the outflow pipe AR2 ends far before the beginning of the stretching cone RK. The formation of condensed water on the filling needle is, likewise, avoided.

When, by contrast, the outflow pipe AR2 extends up to the stretching cone RK, then monomers can occur, which are released in the extrusion, and form a growing needle crust which can disturb the stretching cone RK. The filling compound can also deposit on the end of the filling needle and in combination with the monomers, produce a tough coating which disturbs the extrusion process. During start-up, melt can remain suspended at the filling needle and this can lead to more serious disturbances. When the filling needle AR2 extends up into the stretching cone RK, a difficult adjustment of the filling needle is required. In the present invention, by contrast, only the completely coated bundle LWF12 enter the nipple center opening into the stretching cone RK. Given the same extrusion tool EX, the stretching cone RK is always identically reproduced and does not depend on the potential immersion depth of the filling needle AR2 because, of course, this already ends before the extruder head EX.

Both the entry pipes ER1 and ER2, as well as the outflow pipes AR1 and AR2, are expediently fashioned with screw connections in such a way that they can be interchangeably arranged on the respective pressure chambers DK1 and DK2. An adaptation and re-equipping, given different bundle diameters, i.e., different number of leads, can thus be produced in a very simple manner. Keeping filling needles on supply, likewise, becomes simpler as a result of the invention because this is mainly restricted to filling needles, particularly corresponding to the outflow pipes AR2, whose inside diameter corresponds to the inside diameter of the produced product. Valid as a guideline is that the outflow pipe or filling needle AR2 corresponds to the inside diameter of the product to be manufactured and, roughly, from 0.45 mm through 3.5 mm. Since the filling compound coating is constant, regular fluctuations hardly occur. For example, given application of a double envelope UH, it is thus also possible to carry out a co-extrusion of both envelope materials in a single extruder head.

The invention offers considerable advantages for the preparation of the filling compound. Large gas bubbles, which occur, for example, when pouring the filling compound into the pressure reservoirs BT1 and BT2 must, in fact, be avoided in the pressure coating. However, it is adequate here to slightly evacuate the filling compound only when being poured into the second container BT2. A low vacuum is applied in the pressure reservoir BT2, which draws the filling compound into the reservoir via a sheet die. Further details in this regard are disclosed, for example, in German published application No. 35 16 206. A gear pump or worm pump limiting the conveying pressure is built in at the bottom of the pressure reservoir and this pump conveys the filling compound to the coating gear pump ZP2.

An advantage over previous embodiments is that the pressure reservoir BT2 having the filling compound FM2 need no longer be pressurized. Replenishing during operations is, thus, possible and, for example, 24-hour manufacture and a central filling compound supply are easy to carry out.

The apparatus of the invention is suitable both for horizontal as well as vertically operating throughput directions. The filling compounds FM1 and FM2 can be selected identically and should be of such a nature that they do not drip off before they reach the stretching cone RK. Thixotropic filling compounds or high viscosity filling compounds, crosslinking filling compounds to which a thixotropic agent has been added. For example, up to a maximum of 3% highly dispersive silicon dioxide (aersosil) are particularly suitable.

As illustrated in FIG. 2, the pre-coating in the first filling stage FS11 can also occur by means of a saturation vessel TG, which is advantageously arranged to work for a vertical execution. In addition, the leads LW1-LWn of the light waveguide bundle can also be combined into an SZ-stranded bundle by means of a stranding head VS driven in a reversing fashion so that this arrangement forms a filling station FS11, which essentially corresponds to the filling stage FS1 of FIG. 1 in functional terms. The bundle LWF11 precoated in this way moves past a stripping mechanism AB1, which is provided at the output of the saturating vessel TG. Such a high manufacturing speeds cannot be achieved because air can be more easily enclosed or entrapped in the bundle. The stripper AB1 lies in the stranding point or following point.

Although various minor modifications may be suggested by those versed in the art, it should be understood that I wish to embody within the scope of the patent granted hereon all such modifications as reasonably and properly come within the scope of my contribution to the art.

I claim:

1. In a method for manufacturing optical transmission elements comprising the steps of providing a light waveguide bundle having at least one light waveguide lead, applying a first layer of a filling compound on the bundle, subsequently applying a second layer of a filling compound onto the lead with the first layer of the filling compound and then applying an envelope, the improvements comprising a step of stripping off a substantial amount of the first layer of filling compound subsequent to the step of applying the first layer of filling compound and before the step of applying the second layer and said step of stripping off being carried out under a pressure which is lower than the pressure applied during the steps of applying the first and second layers of filling compound so that gas bubbles in the first layer are removed.

2. In a method according to claim 1, wherein the steps of applying a filling compound applies the same composition for the first layer and the second layer.

3. In a method according to claim 1, wherein the step of stripping off the portion of the first layer of filling compound strips off the first layer in an amount in a range of between 10% and 50% of the first layer.

4. In a method according to claim 1, wherein the step of applying the first coating compound applies the first layer at a given pressure and the step of applying the second layer applies the layer at a second pressure, said second pressure being selected to be in a range of 2-50 times higher than the first pressure.

5. In a method according to claim 1, wherein the step of applying the first layer of filling compound moves the light waveguide bundle through a first filling stage having a pressurized chamber having an inlet and outlet and the step of applying the first layer of filling compound to the light waveguide includes applying the filling compound to flow out both the inlet and outlet of said pressurized chamber with the amount flowing out of the inlet being greater than the outlet to apply a braking force on the movement of the bundle through the stage.

6. In a method according to claim 5, wherein the step of applying the second layer utilizes a second filling stage having a pressure unit with an inlet and outlet and the pressure of applying the filling compound in the first filling stage is selected to be higher than the pressure in the second filling stage, and preferably in a range of 5-10 times as high.

7. In a method according to claim 5, wherein the first filling stage has a reservoir for receiving the filling compound, said method includes collecting the filling compounds emerging from the inlet and outlet of the first filling stage, as well as the filling compound being stripped from the coated bundle back to the supply reservoir of the first stage.

8. In a method according to claim 1, which includes degasifying the filling compound being applied as the second layer step.

9. In a method according to claim 1, wherein the step of applying the first layer uses a first filling stage having an inlet tube and an outlet tubular guide and the step of applying the second layer utilizes a second filling stage having an inlet and an outlet tube, said tubes guiding the waveguide bundle as it passes through the first filling stage and then the second filling stage.

10. In a method according to claim 9, wherein the step of applying an envelope includes providing an extruder having an opening through which the coated bundle passes as the envelope is extruded into a stretch-cone shape onto the bundle, said outlet tube of the second coating stage terminating before said extuder so that the coated bundle can be inspected prior to entering the opening of said extruder.

11. An apparatus for manufacturing optical transmission element comprising a coated bundle containing at least one optical waveguide surrounded by an envelope, said apparatus comprising means for applying a first coating to a bundle, means for stripping a portion of the first coating from said bundle, means for applying a second coating on the remaining portion of the first coating and means for applying an envelope onto the second coating to produce the optical transmission element, said means for stripping providing a pressure on the bundle with the first coating which is less than the pressure during applying the first and second coatings.

12. An apparatus according to claim 11, wherein each means for applying the first coating and second means for applying second coating include a pressure chamber having an inlet tube and an outlet tube.

13. An apparatus according to claim 12, wherein the means for applying an envelope includes an extruder having a central opening for receiving the bundle with the coatings and for extruding an envelope thereon, said extruder being positioned at a space relationship to the outlet tube of the second coating means so that the coated bundle is exposed prior to entering the opening of the extruder.

14. An apparatus according to claim 12, wherein the means for applying the first coating includes a reservoir having an arrangement for collecting the filling material stripped by the stripping means and also collecting excess filling material flowing out of the inlet and outlet tubes of the first filling means.

* * * * *